United States Patent Office 3,455,811
Patented July 15, 1969

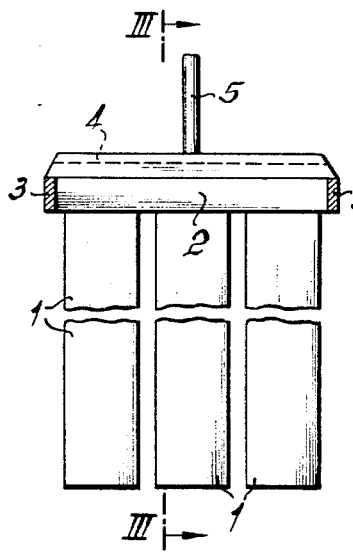
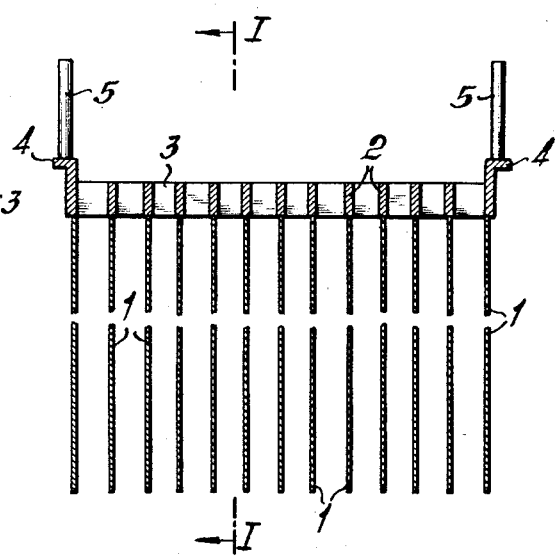
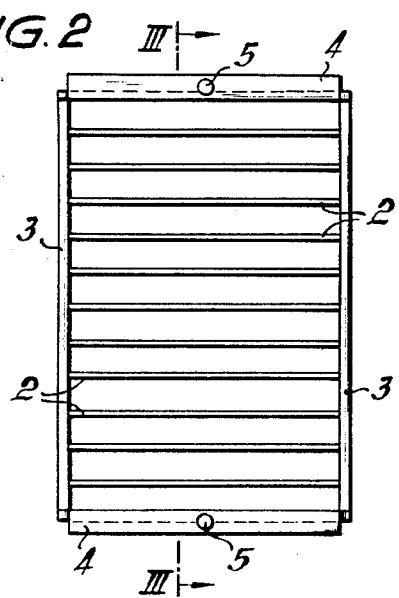
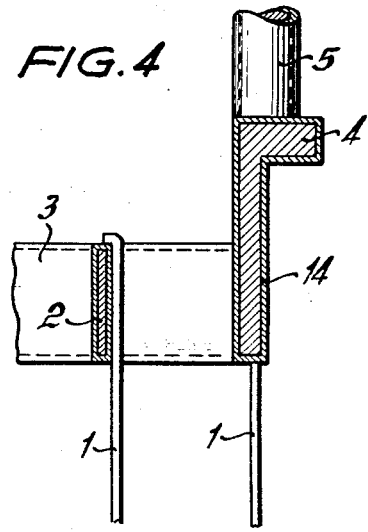

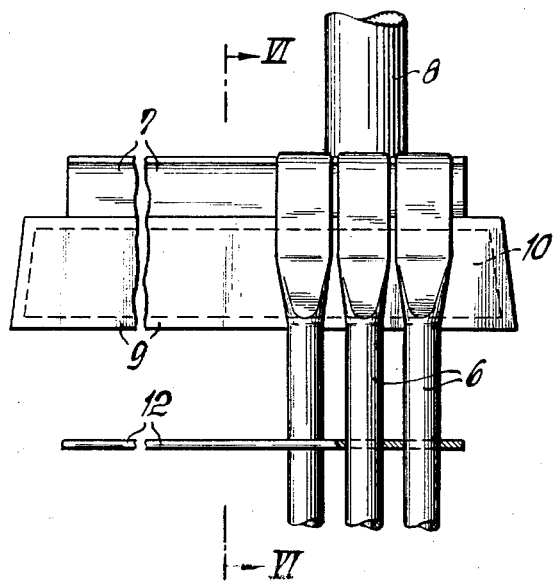
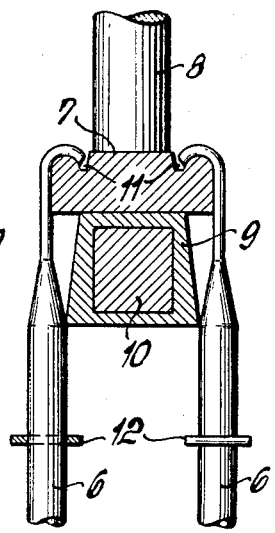
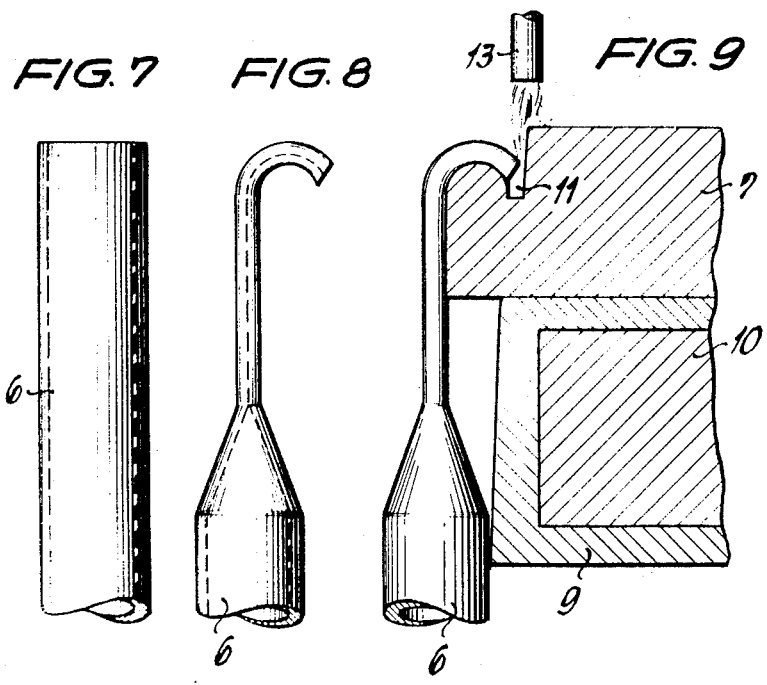

3,455,811
ELECTRODE SYSTEM FOR USE IN THE ELECTROLYTIC PRODUCTION OF MANGANESE DIOXIDE
Ludwig Bender, Bruhl, near Cologne, Heinz Harnisch, Lovenich, near Cologne, Herbert Diskowski, Knapsack, near Cologne, and Friedrich-Karl Frorath, Kierdorf, near Cologne, Germany, assignors to Knapsack Aktiengesellschaft, Knapsack, near Cologne, Germany, a corporation of Germany
Filed May 2, 1967, Ser. No. 635,554
Claims priority, application Germany, May 11, 1966, K 59,224
Int. Cl. B01k 3/04; C22d 1/24
U.S. Cl. 204—242     16 Claims

ABSTRACT OF THE DISCLOSURE

An electrode system for use in the production of manganese dioxide in an electrolytic cell, wherein cathode plates are secured to grate bars which are parallel with each other and which are placed within a rectangular cathode frame, the narrow sides of the frame having secured to their upper rim portions an outwardly directed flange, and wherein the anodes, which comprise tubular structures, are disposed between the cathode plates and are suspended from anode holders, the anode holders being loosely supported by anode-supporting beams placed above the cathode plates, the cathode-frame flanges being supported by the narrow sides, and the anode-supporting beams being supported by the longitudinal sides, of the supporting frame associated with the electrolytic cell.

---

This invention relates to electrode systems, and in particular to those suitable for use in the production of manganese dioxide in electrolytic cells, these being cells which can be used to effect the electrolytic precipitation of a metal or metal compound, e.g. that of manganese dioxide by the anodic oxidation of a dissolved manganous salt, preferably manganous sulphate dissolved in sulphuric acid, using lead or lead-alloy electrodes.

The chief requirement which electrode systems have to meet is that a fairly large and efficient electrode surface should be accommodated in a fairly small space, because this enables the individual electrodes to be spaced from one another at reasonably small intervals and enables unnecessary loss of power (as heat) to be avoided. For this reason, in the electrolytic cell of the present invention, the cathode plates, which are spaced apart to ensure good conductivity, are secured in an upright position to grate bars which are parallel to and spaced from each other and which are placed within a rectangular cathode frame formed of bars disposed in an upright position, the narrow sides of the frame having secured to their upper rim portions an outwardly-directed flange. The anodes comprise tubular structures. They are disposed, parallel with each other, in groups, in gaps between individual rows of cathode plates, and are suspended from anode holders and secured thereto so as to ensure good conductivity, the anode holders being loosely supported by anode-supporting beams placed above the cathode plates so as to be spaced therefrom and parallel therewith. The cathode-frame flanges are supported by the narrow sides, and the ends of the anode-supporting beams are supported by the longitudinal sides, of the supporting frame associated with the electrolytic cell, through interposed electrically non-conducting ledges, e.g. wooden or plastic ledges.

The cathode frame, including the grate bars, is preferably made up of flat steel bars and homogeneously lead-coated. Each of the two flanges secured to the narrow sides of the cathode frame preferably carries an upwardly-directed current-supply bolt of copper, which is hard-soldered or brazed thereto and is also homogeneously lead-coated. The two flanges preferably rest on the supporting frame of the electrolytic cell through wooden or plastic ledges, as indicated earlier.

The cathode plates are preferably formed of a lead alloy and soldered to the grate bars forming the cathode frame so as to leave gaps therebetween.

The anode-supporting beams are preferably formed of lead or lead-alloy coated profiled steel which, for reasons of strength, may, for example, have a rectangular cross-section.

To the upper side of each anode holder, which is preferably cast from a lead alloy, there is preferably secured an upwardly-directed current-supply bolt cast integrally therewith. Also, the upper side of each anode holder preferably has two grooves parallel with the upper longitudinal edges of the holder.

The tubular anode structures are preferably made from a lead alloy and preferably have flattened upper ends bent like a hook, the bent portions being hooked in the grooves in the anode holders and soldered thereto. Thus it is preferred that each anode holder should have two grooves and receive two rows of tubular anode structures. These rows may also be termed tubular anode walls. The clear distance between two tubular anode structures preferably lies between 5 and 50 mm., and may for instance be 15 mm. Preferably 5 to 35, e.g. 23, tubular anode structures are arranged to form a tubular anode wall, for each groove in the anode holder; the depth of immersion in the electrolyte is preferably between 1500 and 2500 mm., e.g. about 1900 mm.

In joining the tubular anode structures together to form a wall, it is advantageous to omit one or more of the tubular anode structures at certain intervals. This facilitates the flow of the electrolyte and thus evens out differences in concentration. The gaps so left in the individual tubular anode walls should preferably be in staggered relationship to one another.

As a result of this arrangement, the relatively dense manganese dioxide is found to precipitate in the form of a thick layer. It is advisable to provide for the precipitation to take place at convex surfaces having a radius of curvature of a relatively low order, e.g. as indicated hereinafter, because precipitation at plane or concave surfaces would, over an electrolysis period of about 2 to 5 weeks, produce cracks in the layer of precipitated manganese dioxide and corrosion of the anode material. It is also advisable to provide that the clear distance between the individual tubular anode structures should be less than the thickness of the precipitating layer. The manganese dioxide deposits are thus allowed gradually to grow together and gradually to form a continuous wall.

The tubular anode structures are preferably reinforced with respect to each other by means of from one to five perforated tapes of sheet lead through whose perforations they are passed; the use of three such tapes is particularly preferred. Preferably the tapes are vertically spaced from one another at intervals of about 650 mm. This measure prevents the tubular anode structures from being deformed during electrolysis; this is valuable because such deformation might produce cracks in the precipitated manganese dioxide and corrosion of the tubular anode structures.

Similarly, the tubular anode structures might directly contact the cathode plates and a short-circuit within the electrode system would result.

Since, owing to the specific nature of the electrolysis, the tubular anode structures have to be melted down and have to be replaced by fresh anodes, preferably after each period of electrolysis, the anode-supporting beam is preferably a separate component from the anode holder and the tubular anode structures. The anode-supporting beam, which cannot, for reasons of strength, be formed exclusively of a lead alloy, can readily be made by surrounding a profiled steel section with a lead alloy, and can then be used over and over again.

An electrode system according to the present invention is shown diagrammatically in the accompanying drawings, wherein FIGURES 1 to 4 illustrate the cathode system and FIGURES 5 to 9 the anode system.

In the drawings:

FIGURE 1 is a cross-sectional view of the cathode system taken along line I—I of FIGURE 3;

FIGURE 2 is a top plan view of the same;

FIGURE 3 is a side-elevational view taken along line III—III of FIGURES 1 and 2;

FIGURE 4 is a representation on an enlarged scale of the upper right-hand corner of FIGURE 3;

FIGURE 5 is a side-elevational view of the anode system;

FIGURE 6 is a cross-sectional view of the same taken along line VI—VI of FIGURE 5;

FIGURE 7 shows the upper end of a tubular anode structure before the finishing treatment;

FIGURE 8 shows the same after the finishing treatment; and

FIGURE 9 is a representation on an enlarged scale of the left-hand portion of FIGURE 6.

As shown in FIGURES 1 to 4, the cathode frame, i.e. the holding means for the actual electrochemically-active cathodes, is a rectangular frame composed of flat profiled steel sections 3 in an upright position, the narrow sides of the frame having secured thereto a flange 4 directed outwardly and supporting the cathode frame when inserted in the electrolytic cell. Grate bars 2, formed of profiled flat steel sections and spaced from one another, are disposed inside the cathode frame so as to be parallel with the narrow sides thereof. Each of the two flanges 4 has soldered thereon a copper current-supply bolt 5 extending vertically upwards. The arrangement so far described has a homogeneous lead coating 14. The lamellar cathode plates 1 formed of a lead alloy are soldered to the grate bars 2 (actually to their upper edges, for technical reasons) as shown in FIGURE 4. The gaps left between the individual cathode plates are intended to initiate and favour the flow of electrolyte, which is desirable for evening out any differences in concentration.

The anode portion forming part of the electrode system shown is designed differently from the cathode portion in view of the properties of the manganese dioxide precipitating at the anodes. The precipitation of manganese dioxide at plane and concave surfaces has been found to make the precipitated layer of manganese dioxide subject to cracking, which may give rise to corrosion of the electrode material. No such disadvantage arises, however, when the manganese dioxide is precipitated on convex surfaces with a radius of curvature between 5 and 75 mm. A radius of curvature of 15 mm. is particularly preferred. The actual anode is therefore composed of a plurality of tubular anode structures 6 having an outside diameter of about 30 mm. FIGURE 7 of the accompanying drawings shows a section of such a tubular anode structure 6 formed of a lead alloy. The tubular anode structure 6, of which the lower end may be open or closed, has a partially flattened upper end bent like a hook, as shown in FIGURE 8. Five to 35, preferably 23, of these tubular anode structures 6 are arranged parallel with each other and spaced from each other at intervals of 5 to 50 mm., preferably 15 mm. As mentioned above, one or more anode structures may be left out, to favour the flow of electrolyte. The gaps so left in the anode walls should be in staggered relationship to one another. The anode holders 7, intended jointly to hold a number of anode structures 6, are lead-alloy bars obtained by simple furnace casting. A current-supply bolt 8 of the same material is integrally cast on to one of their ends. The bar is cast with two grooves 11, each parallel with the two upper longitudinal edges of the bar, in which the bent upper ends of the anode structures 6 are hooked, to be finally soldered to the anode holders 7 by means of a gas blowpipe, shown at 13, without the use of any further material. As mentioned above, each of the anode holders 7 is provided with two grooves 11. This means that two rows of walls of anode structures 6 will be formed, as shown in FIGURE 6. The whole is loosely supported by the anode-supporting beams 9, 10, of which the two ends are arranged, as with the cathode frame, to be supported, through interposed wooden or plastic ledges, by the supporting frame of the electrolytic cell; the anode-supporting beams can be used over and over again. In view of the considerable weight of the anode holder, including the two walls formed by the anode structures, the anode-supporting beam is made of profiled steel sections 10, which may have a rectangular cross-section, surrounded with a lead or lead-alloy coating 9. The anode structures 6 are prevented from being bent by means of a number of layers (preferably three layers) of perforated lead-alloy tapes 12, arranged one above the other, through whose perforations the anode structures are passed.

We claim:

1. An electrode system suitable for use in the production of manganese dioxide in an electrolytic cell, wherein cathode plates spaced from one another so as to ensure good conductivity are secured in an upright position to grate bars which are parallel with and spaced from each other and which are placed within a rectangular cathode frame formed of bars disposed in an upright position, the narrow sides of the frame having secured to their upper rim portions an outwardly-directed flange, and wherein the anodes, which comprise tubular structures, are disposed, parallel with each other, in groups, in gaps between individual rows of cathode plates, and are suspended from anode holders and secured thereto so as to ensure good conductivity, the anode holders being loosely supported by anode-supporting beams placed above the cathode plates so as to be spaced therefrom and parallel therewith, the cathode-frame flanges being supported by the narrow sides, and the anode-supporting beams being insulatingly supported by the longitudinal sides, of the supporting frame associated with the electrolytic cell.

2. An electrode system as claimed in claim 1, wherein the cathode frame is made up of flat steel bars and homogeneously lead-coated, each of the two flanges secured to its narrow sides carrying an upwardly-directed current-supply bolt of copper hard-soldered thereto and also homogeneously lead-coated.

3. An electrode system as claimed in claim 1, wherein the cathode plates are formed of a lead alloy and soldered to the grate bars forming the cathode frame.

4. An electrode system as claimed in claim 1, wherein the anode-supporting beams are formed of lead or lead-alloy coated profiled steel.

5. An electrode system as claimed in claim 1, wherein the anode holders are cast from a lead alloy and each has secured to its upper side an upwardly-directed current-supply bolt cast integrally therewith, the upper side of each anode holder having two grooves parallel with the upper longitudinal edges of the holder.

6. An electrode system as claimed in claim 1, wherein the anodes have convex surfaces with a radius of curvature between 5 and 75 mm.

7. An electrode system as claimed in claim 6, wherein the anodes have convex surfaces with a radius of curvature substantially equal to 15 mm.

8. An electrode system as claimed in claim 5, wherein the tubular anode structures are made from a lead alloy and have flattened upper ends bent like a hook, the bent portions being hooked in the grooves in the anode holders and soldered thereto, each anode holder receiving two rows of tubular anode structures.

9. An electrode system as claimed in claim 8, wherein the clear distance between two tubular anode structures is between 5 and 50 mm., each groove receiving 5 to 35 tubular anode structures, and the depth of immersion in the electrolyte being 1500 to 2500 mm.

10. An electrode system as claimed in claim 9, wherein the clear distance specified is about 15 mm.

11. An electrode system as claimed in claim 9, wherein each groove receives about 23 tubular anode structures.

12. An electrode system as claimed in claim 9, wherein the depth of immersion in the electrolyte is substantially equal to 1900 mm.

13. An electrode system as claimed in claim 9, wherein the tubular anode structures are joined together to form a wall but one or more of the tubular anode structures are omitted a intervals, the gaps so left in the anode walls being in staggered relationship to one another.

14. An electrode system as claimed in claim 8, wherein the tubular anode structures are reinforced with respect to each other by means of from one to five perforated tapes through whose perforations they are passed, the tapes being vertically spaced from one another at intervals of about 650 mm.

15. An electrode system as claimed in claim 12, wherein the tubular anode structures are reinforced with respect to each other by means of three of the perforated tapes specified.

16. An electrode system as claimed in claim 1, wherein the cathode-frame flanges are supported by the narrow sides, and the anode-supporting beams are supported by the longitudinal sides, of the supporting frame associated with the electrolytic cell, through interposed ledges made of wood and plastic, respectively.

References Cited
UNITED STATES PATENTS

| | | | |
|---|---|---|---|
| 2,766,198 | 10/1956 | Carosella | 204—288 |
| 272,391 | 2/1883 | Thiollier | 204—96 |

WINSTON A. DOUGLAS, Primary Examiner

H. A. FEELEY, Assistant Examiner

U.S. Cl. X.R.

204—96, 281, 286